Jan. 15, 1963   W. M. GRIMES, JR   3,074,007
CURRENT AND VOLTAGE REGULATOR
Filed April 24, 1959
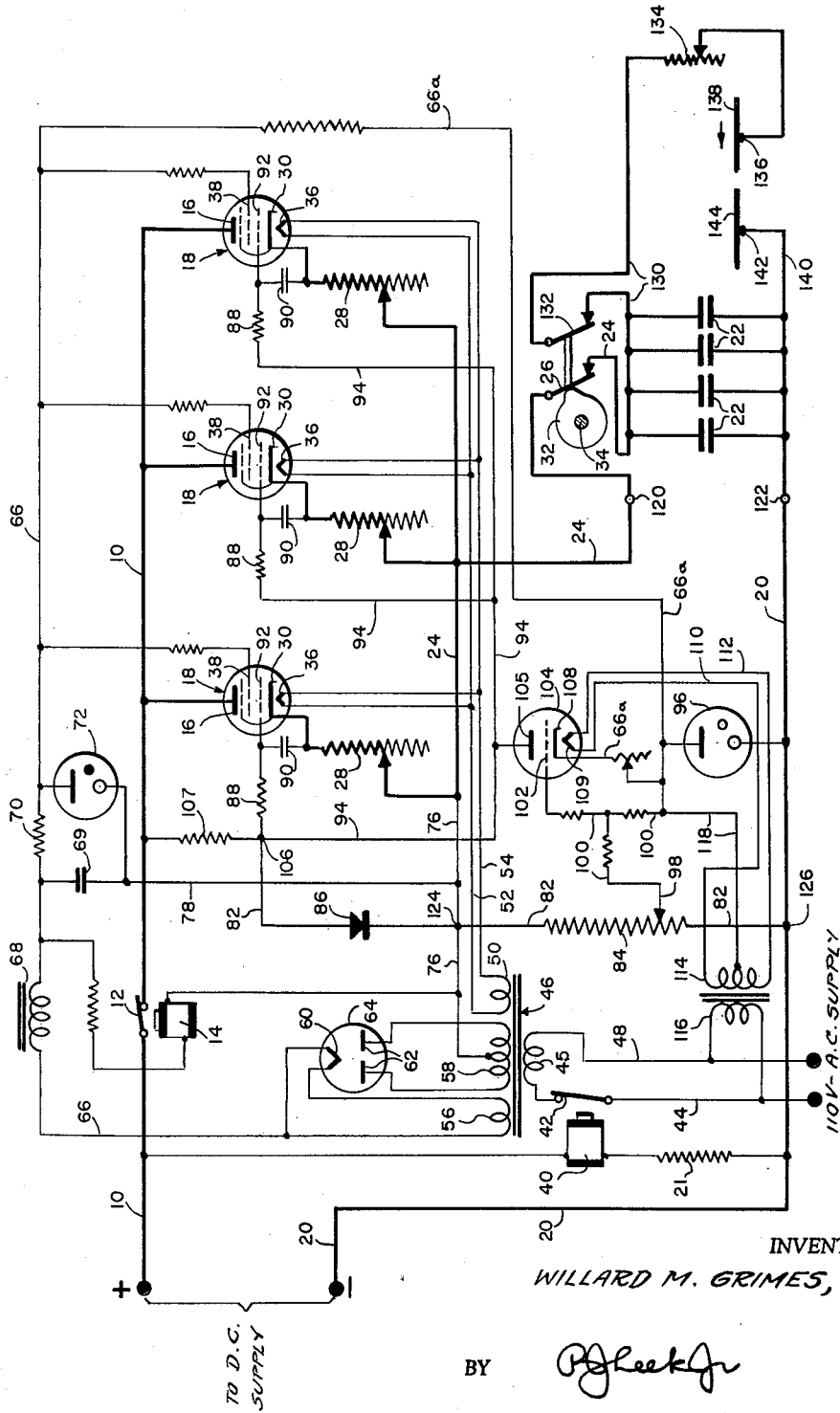
INVENTOR
WILLARD M. GRIMES, Jr.
BY
ATTORNEY

United States Patent Office 3,074,007
Patented Jan. 15, 1963

3,074,007
CURRENT AND VOLTAGE REGULATOR
Willard M. Grimes, Jr., Wayne Township, Passaic County,
N.J., assignor to Westinghouse Electric Corporation,
East Pittsburgh, Pa., a corporation of Pennsylvania
Filed Apr. 24, 1959, Ser. No. 808,813
5 Claims. (Cl. 323—22)

The present invention relates to machines for fabricating sectional lead wires for incandenscent lamps, discharge devices and the like and, more particularly, to a current and voltage regulating means for the welding circuit of such a machine.

Sectional lead wires for incandescent lamps, discharge devices and the like are fabricated on an automatic machine of the type shown in U.S. Patent No. 2,034,560, issued March 17, 1936, to W. D. Bumstead. Such sectional lead wires comprise a nickel end-section utilized entirely within the lamp for the mounting of tungsten filaments thereon, a Dumet mid-section employed for sealing to a vitreous press of the lamp stem, and a copper end-section for connection to the metallic base. Dumet is the trade name for a composite wire having a metallic core rod, suitably a nickel-iron alloy, the core rod being brazed by means of a metallic brazing material, such as brass, to a copper outer sheath.

On the above-mentioned automatic machine, the nickel end-section and the copper end-section are supported in alignment with each other and the Dumet mid-portion, each section being located a short distance apart.

In the usual practice the nickel end-section and Dumet mid-section, for example, are moved toward each other at a relatively slow speed. When the Dumet mid-section and the nickel end-section make contact, a condenser is discharged through a current-limiting resistance and the section-holding jaws to effect the melting of the contacting end portions of the adjacent sections and the ultimate formation of the weld knot or joint between such sections.

The welding circuit utilized by the above-mentioned machine for fabricating sectional lead wires utilizes cam-operated switching means for connecting a direct-current source of electricity to the condensers through the above-mentioned current-limiting resistance to first charge the condensers to the desired voltage and then to permit (through the use of polarity-reversing switches) the discharge of the condensers through the adjacent sections of the sectional lead wire which are to be welded together. During the welding cycle current surges occasionally occur from either occasional shorts in the welding circuit or from the heavy transient demand of the discharge condensers during the charging of the latter. The current-limiting resistance (which must be small enough to permit the condensers to charge to 99.4% of the desired final value of the voltage charge in a predetermined limited time) also permits a peak current during the charging portion of the cycle which is approximately five times the average current flowing in the welding circuit during charging of the condensers. If for example, six such machines for fabricating sectional lead wires are utilized simultaneously, there is the possibility that all such machines will simultaneously draw peak currents, thereby subjecting the voltage supply to a peak demand which is thirty times the average peak demand required by one such fabricating machine. On the other hand during 10% of the charging time (near the end of the charging period), all six fabricating machines would each be drawing less than the average current required by one such fabricating machine. Because of these large and rapid variations in transient current demand, the voltage fluctuates thereby effecting the consistency of the weld knots formed between the sections of the composite lead wire. In addition, variations in the A.C. supply voltage of as much as ±15 volts, cause variations in the D.C. supply voltage thereby further affecting the consistency of formed weld knots.

Previous regulating systems for the welding circuit of such fabricating machines have utilized thyratron tubes which can be energized only when the firing conditions within the tube are adequately controlled and which thyratron tubes can not be turned off until the welding cycle has been completed. These limitations eliminate the use of such thyratrons for rapid transient control of the welding circuit.

It is the general object of the present invention to avoid and overcome the foregoing and other difficulties of and objections to prior-art practices by the provision of regulating means for the welding circuit of a sectional lead-wire fabricating machine, which regulating means maintains a constant-charging current in the welding circuit until the condensers have been charged to a predetermined voltage and then automatically changes from a current regulator to a voltage regulator which maintains the predetermined voltage on the charged condensers at such constant value until they discharge during the next weld.

Another object of the present invention is the provision of means in the welding circuit of a sectional lead-wire fabricating machine which protects the cathodes of the electronic elements of the regulating means from damage due to premature application of the plate voltage to such cathodes and further provides application of voltage on the screen grids of the electronic elements with or after the application of the plate voltage thereto.

The aforesaid objects of the present invention and other objects which will become apparent as the description proceeds are achieved by providing regulating means in the welding circuit of a sectional lead-wire fabricating machine, with such regulating means being operable to maintain the charging current constant in the welding circuit until the condensers are charged to a predetermined voltage, the regulating means then being automatically operable to switch itself from its operation as a current regulator to operation as a voltage regulator which thereafter maintains the predetermined voltage on the charged condenser at this constant value until it is discharged during the next welding operation.

For a better understanding of the present invention reference should be had to the accompanying drawing, wherein the sole FIGURE of the drawing is a wiring diagram of a condenser-charging and welding circuit for a sectional lead-wire fabricating machine, which charging circuit has incorporated therein the current and voltage regulating apparatus of the present invention.

Although the principles of the present invention are broadly applicable to a current and voltage regulating apparatus for the charging of condensers, the present invention is particularly adapted for use in conjunction with the charging of condensers for a sectional lead-wire fabricating machine.

With specific reference to the form of the present invention illustrated in the drawing, a direct-current voltage supply, suitably about 600 volts, is indicated generally by the legend "D.C. Voltage Supply." The positive side of such voltage supply is connected by a line-voltage conductor 10 through a normally-open contact 12 of a relay 14 to plates 16 of a plurality of paralleled beam-power tubes, utilized as current-regulating tubes 18. As illustrated in the drawing, three such current-regulating tubes 18, each capable of passing about 0.1 amp., are employed.

Another D.C. line-voltage conductor 20 extends from the negative side of the "D.C. Voltage Supply" to one side of welding condensers 22 which are to be charged by the current and voltage-regulating apparatus of the present invention. A conductor 24 connects the other side of the welding condensers 22 through a cam-operated switch 26 and current-feedback resistors 28 to the cathodes 30 of the individual current-regulator tubes 18. This cam-operated switch 26 is operable by a cam 32 on the main-cam shaft 34 of a sectional lead-wire fabricating machine (not shown) but of the type disclosed in the above-mentioned U.S. Patent No. 2,034,560.

So that heaters 36 of the current-regulating tubes 18 are energized before the D.C. voltage of about 600 volts is applied to the plates 16 thereof and further so that screen grids 38 of such current-regulator tubes 18 will be energized simultaneously with or shortly after the application of the D.C. voltage to such plates 16, protective means comprising the above-mentioned relay 14 and a second relay 40 is employed.

*Protective Means*

This second relay 40 is shunted across the D.C. line-voltage conductors 10 and 20 in series with a resistor 21 and has a normally-open contact 42 disposed in an A.C. line-voltage conductor 44 extending from one side of a suitable alternating-current voltage supply (indicated by the legend "A.C. Supply") to the primary 45 of a transformer 46, the other side of which primary 45 is connected to the other side of the "A.C. Supply" by another line-voltage conductor 48. If the D.C. voltage is "on," the relay 40 is energized thus closing its normally-open contact 42 with resultant energization of the primary 45 of the transformer 46. Energization of the primary 45 results in the lighting of the heaters 36 by a secondary 50 (connected to the heaters 36 by conductors 52 and 54) before relay 14 closes its normally-open contact 12 (as hereinafter explained) to permit application of the plate voltage to the plates 16. Simultaneously, with energization of the secondary winding 50, secondaries 56 and 58 energize cathode 60 and plates 62 respectively of a full-wave rectifier 64. A suitable D.C. voltage from such full-wave rectifier 64 is applied to the screen grids 38 of all the current-regulator tubes 18, by a line 66 extending thereto through a choke-input filter (comprising an inductance 68 and a capacitance 69) and a current-limiting resistor 70.

To maintain such screen-grid voltage constant at about 150 volts above that of the cathodes 30, a voltage-regulating tube 72 is disposed in shunt with the current-limiting resistor 70. A conductor 76 extending from a junction with the conductor 24 to the mid-point of the secondary 58 is the negative return for all the cathodes 30 of the tubes 18 and completes the screen-grid voltage circuit. A conductor 78 connects the voltage-regulator tube 72 across the screen grids 38 and the cathodes 30.

It will be understood that by shunting the relay 14 across the line 66 and the conductor 76 the filtered D.C. output of the secondary winding 58 through the rectifier 64 energizes the relay 14 with resultant closure of its normally-open contact 12 and the attendant application of the plate voltage to the plates 16 of all the current-regulator tubes 18 shortly before or simultaneously with the application of the voltage to the screen grids 38.

Having described the protective energization of the current-regulating tubes 18, the means utilized to regulate the charging current to the welding condensers 22 will now be considered.

*Current-Regulating Means*

The regulation of the D.C. charging current for the welding condensers 22 is obtained by the feed-back of the charging current through line 76, a diode 86, line 82 and a parasitics suppressor (comprising the resistance 88 and capacitance 90) to a control grid 92 of the left-hand current-regulating tube 18. The other two control grids 92 of the remaining voltage-regulator tubes 18 are connected in parallel with the control grid 92 of the left-hand tube 18 by a conductor 94.

When the discharged welding condensers 22 are connected to output terminals 120 and 122 by closure of the cam-operated switch 26, the positive voltage between the D.C. line conductor 10 and the junction point 124 causes the diode 86 to conduct thereby electrically connecting the control grids 92 to the current-feedback resistors 28.

The large initial surge of current flowing through the current-feedback resistors 28 causes a voltage drop which is fed through the lines 24 and 76, the conducting diode 86 and the conductors 82 and 94 to the control grids 92 thereby leveling off the current flowing through the current-feedback resistors 28 to a relatively constant value and resulting in the charging of the welding condensers 22 at this constant current value.

Such control grids 92 remain electrically connected to the current-feedback resistors 28 most of the current-regulating phase of the charging cycle. However, later in the charging cycle when the desired charge of about 300 volts is provided on the welding condensers 22, diode 86 ceases to conduct (due to operation of a voltage-regulating means which is actuated by the increase in the voltage across output terminals 120 and 122) thereby releasing the electrical connection between the control grids 92 and current-feedback resistors 28 and permitting such grids to be controlled by the voltage-regulating means as now explained.

*Voltage-Regulating Means*

To provide means for regulating the D.C. voltage supply for the welding condensers, the hereinbefore mentioned conductor 82 extends from the D.C. line conductor 20 through a potentiometer 84 to a junction 124 with the line 76, thereby paralleling such potentiometer 84 with the condenser output terminals 120 and 122.

This voltage-regulating action is obtained by comparing a fixed portion of the output voltage across the potentiometer 84 with a standard voltage source, such as the voltage-reference tube 96. The fixed portion of the output voltage is obtained from a slider 98 and fed by a conductor 100 to a control grid 102 of a D.C. amplifier tube 104. The plate 105 of the D.C. amplifier tube 104 is connected to the previously mentioned conductor 94 and hence to the control grids 92 of all the current-regulating tubes 18. Such plate 105 is also connected at a junction 106 to a plate-load resistor 107 connected across the junction 106 and the D.C. line-voltage conductor 10. Cathode 108 of such D.C. amplifier tube 104 is maintained at about 150 volts with respect to the grid 102 by the voltage-reference tube 96, with this tube being connected to an extension line 66a from the conductor 66 as well as to the grid conductor 100 through a suitable resistor, and to the D.C. line-voltage conductor 20. A heater 109 of the D.C. amplifier tube 104 is connected by lines 110 and 112 to a secondary 114 of a suitable transformer, the primary 116 of which is connected across the A.C. voltage line conductors 44 and 48. A negative return 118 for the cathode 108 and control grid 102 of the D.C. amplifier tube 104 connects the conductor 100 to the secondary 114.

Since the potential across the condenser-output terminals 120 and 122 is the same as the potential across the paralleled junction points 124 and 126 to which the potentiometer 84 is connected, the voltage across such potentiometer 84 increases with the voltage across the output terminals 120 and 122 and hence the welding condensers 22. As the charge on the welding condensers 22 rises toward the final predetermined value of about 300 volts, the voltage (applied by the slider 98 through line 100 to the control grid 102 of the D.C. amplifier tube 104) rises to a point where such D.C. amplifier tube 104 conducts, thereby causing current to flow through the plate-load resistor 107 of such D.C. amplifier tube 104. This current flow and resultant voltage drop across the plate-load resistor 107 renders previously conducting diode 86 non-conductive, since the junction 106 is at a lower potential than junction 124, thereby interrupting the electrical circuit between control grids 92 and the current-feedback resistors 28. As a result the voltage on the control grids 92 of the current-regulating tubes 18 goes downwardly to the cut-off value with attendant reduction of the current through the current-feedback resistors 28. This reduced current is sufficient, as it flows through the potentiometer 84, to maintain the now charged welding condensers 22 at the predetermined voltage of about 300 volts.

Any tendency by the now-charged welding condensers 22 to increase their charge voltage above about 300 volts would only result in more voltage being applied through the portion of potentiometer 84 to the control grids 102 of the D.C. amplifier tube 104 with the result that more current would flow through the plate-load resistor 107. This increased current through such resistor 107 further reduces the control-grid voltage on the control grids 92 and results in the flow of less current through the current-regulating tubes 18 and the current feed-back resistors 28. In this condition the current-regulating tubes 18 would be cut-off and the charged welding condensers 22 would be supplying all the current flowing through the potentiometer 84 until the charge voltage on the welding condensers 22 returned to the desired charge level of about 300 volts.

If, however, the charge voltage on the welding condensers 22 decline below the desired value of about 300 volts, the voltage across the potentiometer 84 would decline with it, with resultant reduction of the voltage on the control grid 102 of the D.C. amplifier tube 104 thereby cutting off the current flow in the tube 104 and in the plate-load resistor 107. Such reduction in the current flowing in the plate-load resistor 107 would again render diode 86 conductive and cause the voltage on the control grids 92 of the current-regulating tubes 18 to rise so that such tubes would permit more current to flow therethrough and through the current-feedback resistors 28. This increased current flow restores the charged welding condensers 22 and the potentiometer 84 to the preselected charged value of about 300 volts.

It will be noted from a consideration of the lower right-hand portion of the drawing that the welding condensers 22 are connected by a line 130 through a cam-operated switch 132 and a variable resistor 134 to a holder, indicated diagrammatically at 136, for a Dumet end section 138. A conductor 140 connects the other side of the welding condensers 22 to a holder 142 for a nickel end section 144.

When such holders 136 and 142 move their respective end sections 138 and 144 into engagement during closure of the cam-operated switch 132, the charged welding condensers 22 are discharged through the lines 130 and 140 to achieve in the conventional manner the butt-percussive welding of the Dumet end section 138 to the nickel end section 144.

During this discharging of the welding condensers 22 the voltage across the input terminals 120 and 122, as well as the voltage across the potentiometer 84 (between junction points 124 and 126) drops to about zero volts, thereby carrying the voltage on the control grid 102 of the D.C. amplifier tube 104 downwardly therewith. The decreasing control-grid voltage cuts off the D.C. amplifier tube 104 with a resultant decrease in the voltage drop across the plate-load resistor 107. Concurrently therewith the voltage across such resistor 107 rises in value toward that of D.C. line-voltage conductor 10. The increase in voltage across the plate-load resistor 107 causes the diode 86 to become conductive, whereupon it again electrically connects the control grids 92 of the current-regulating tubes 18 to the current-feedback resistors 28.

The current flowing in the charging circuit is once again completely controlled by the current-feedback potential furnished by the current-feedback resistors 28 and the above-described cycle of operation is repeated.

It will be recognized by those skilled in the art from the foregoing that the objects of the present invention have been achieved by the provision of regulating means for a welding circuit of a sectional lead-wire fabricating machine, which regulating means maintains a constant charging current in the welding circuit until the welding condensers have been charged to a predetermined voltage and then such means automatically changes from a current regulator to a voltage regulator which maintains the voltage on the charged welding condensers constant at such predetermined voltage until the welding condensers are discharged. This regulating means is also provided with means for protecting the cathodes of the current-regulating elements from damage due to premature application of the plate voltage thereto and further prevents energization of the screen grids before the application of the plate voltage.

While in accordance with the patent statutes one best known embodiment of the present invention has been illustrated and described in detail, it is to be particularly understood that the invention is not limited thereto or thereby.

I claim:

1. A current and voltage regulator for maintaining a load current constant until a predetermined load voltage is obtained and for thereafter maintaining said predetermined load voltage constant, said current and voltage regulator comprising current-regulating means connected to a source of variable D.C. voltage for controlling said load current, said current-regulating means having a control member, a unidirectional conducting means connected between the output of the current-regulating means and said control member and operable to feed back said load current from said current-regulating means to said control member and thereby control said load current, said unidirectional conducting means being operative until said load voltage approximates said predetermined load voltage, voltage-regulating means connected to said control member and responsive to fluctuations in the value of said predetermined load voltage to cause said control member to adjust said load current of the current-regulating means and thereby maintain said predetermined load voltage constant.

2. A current and voltage regulator for maintaining a load current constant until a predetermined load voltage is obtained and for thereafter maintaining said predetermined load voltage constant, said current and voltage regulator comprising current-regulating means for controlling said load current, said current-regulating means having an anode, a cathode and a control member, a first means connected between a source of variable D.C. voltage and said cathode and operable by said source of variable D.C. voltage to energize said cathode, a second means connected between said source of variable D.C. voltage and said anode and operable by said first means to cause the application of the anode voltage after energization of said cathode, a unidirectional conducting means connected between the output of the current-regulating means and said control member and operable to feed back said load current from said current-regulating means to said control member and thereby control said load current, said unidirectional conducting means being operative until said load voltage approximates said predetermined load voltage, voltage-regulating means connected to said control member and responsive to fluctuations in the value of said predetermined load voltage to cause said control member to adjust said load current of the current-regulating means and thereby maintain said predetermined load voltage constant.

3. A current and voltage regulator for maintaining a load current constant until a predetermined load voltage is obtained and for thereafter maintaining said predetermined charge, load voltage constant, said current and voltage regulator comprising current-regulating means for controlling said load current, said current-regulating means having an anode, a control member and a screen member, means connected between a source of variable D.C. voltage and said anode and screen member for causing application of anode voltage prior to the application of voltage on said screen member, a unidirectional conducting means connected between the output of said current-regulating means and said control member and operable to feed back said load current from said current-regulating means to said control member and thereby control said load current, said unidirectional conducting means being operative until said load voltage approximates said predetermined load voltage, voltage-regulating means connected to said control member and responsive to fluctuations in the value of said predetermined load voltage to cause said control member to adjust said load current of the current-regulating means and thereby maintain said predetermined load voltage constant.

4. A current and voltage regulator for maintaining a load current constant until a predetermined load voltage is obtained and for thereafter maintaining said predetermined load voltage constant, said current and voltage regulator comprising current-regulating means connected to a source of variable D.C. voltage for controlling said load current, said current-regulating means having a control member, a unidirectional conducting means connected between the output of the current-regulating means and said control member and operable to feed back said load current from said current-regulating means to said control member and thereby control said load current, said unidirectional conducting means being operative until said load voltage approximates said predetermined load voltage, voltage-dividing means responsive to said load voltage, and voltage-regulating means connected to said voltage-dividing means and to said control member and responsive to fluctuations in the value of said predetermined load voltage to cause said control member to adjust said load current of said current-regulating means and thereby maintain said predetermined load voltage constant.

5. A current and voltage regulator for maintaining a load current constant until a predetermined load voltage is obtained and for thereafter maintaining said predetermined load voltage constant, said current and voltage regulator comprising current-regulating means connected to a source of variable D.C. voltage for controlling said load current, said current-regulating means having a control member, a unidirectional conducting means connected between the output of the current-regulating means and said control member and operable to feed back said load current from said current-regulating means to said control member and thereby control said load current, voltage-regulating means connected to said control member and responsive to fluctuations in the value of said predetermined load voltage to cause said control member to adjust said load current of the current-regulating means and thereby maintain said predetermined load voltage constant, said voltage-regulating means also being operatively connected to said unidirectional conducting means for rendering the latter non-conductive when said load voltage approximates said predetermined load voltage.

References Cited in the file of this patent

UNITED STATES PATENTS

| | | |
|---|---|---|
| 2,515,632 | Coffin | July 18, 1950 |
| 2,623,204 | Solomon | Dec. 23, 1952 |
| 2,625,676 | Konick | Jan. 13, 1953 |